E. J. BRADY.
ARTIFICIAL LIGHTING MEANS.
APPLICATION FILED JUNE 13, 1914.

1,122,066.

Patented Dec. 22, 1914.

WITNESSES:

INVENTOR
Edward J. Brady
BY
ATTORNEYS

UNITED STATES PATENT OFFICE.

EDWARD J. BRADY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

ARTIFICIAL-LIGHTING MEANS.

1,122,066.   Specification of Letters Patent.   Patented Dec. 22, 1914.

Original application filed October 22, 1913, Serial No. 796,552. Divided and this application filed June 13, 1914. Serial No. 844,868.

*To all whom it may concern:*

Be it known that I, EDWARD J. BRADY, a citizen of the United States, and a resident of Philadelphia, in the county of Philadelphia and State of Pennsylvania, have invented certain new and useful Improvements in Artificial-Lighting Means, of which the following is a specification.

The invention relates to color filters or absorbing screens which operate to modify artificial light passing through them so as to produce a resultant illumination equivalent to daylight, and this application is a division of my application serially numbered 796,552, filed October 22nd, 1913.

The principal object of the present invention is to provide an efficient color filter or absorbing screen which may be constructed wholly of glass and which may therefore assume various forms useful in the arts, such as bulbs for incandescent electric lights and shades of various kinds.

The invention will be claimed at the end hereof, but will be first described in connection with the accompanying drawings, in which—

Figure 1:
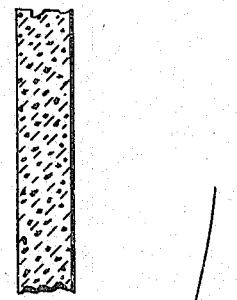
Figure 2:
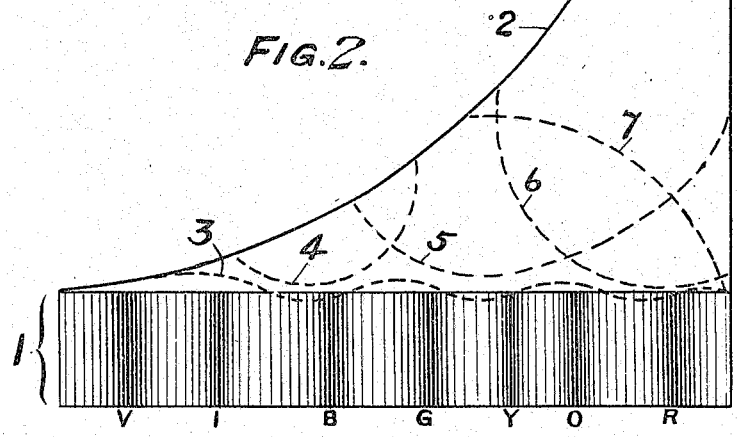

Figure 1, is a transverse sectional view of a color filter or absorbing screen embodying features of the invention, and Fig. 2, is a diagrammatic view hereinafter referred to for the sake of description.

Referring to the drawings and more particularly to Fig. 2, the rectangle 1 diagrammatically represents the spectrum of daylight; the letters V, I, B, G, Y, O and R, indicate the colors of that spectrum. The height of the rectangle represents the intensity of the various colors as present in the spectrum of daylight. The curved line 2 indicates the relative intensity of the various colors in the spectrum of the artificial light which it is desired to modify.

For the sake of illustration and explanation the spectrum of the artifical light source and the spectrum of the daylight source are drawn as of equal intensities at the extreme violet end. Artificial light sources as generically represented by the area included under the curve 2 are usually different from daylight in possessing an excess of the longer spectrum wave lengths, that is yellow, orange and red. An absorbing screen or color filter in order to alter an artifical light spectrum to that of daylight must absorb these excessive radiations. If the relative intensities of the different colors of the spectrum are plotted upon such a scale that the intensities of daylight and the artificial light sources are the same at the blue extremity of the spectrum, then the transmission of the absorbing screen must be as the reciprocal of the ratio at each color of the intensity of the artificial light spectrum to the daylight spectrum.

The color filter or absorbing screen is adapted by absorption to produce the above described result, or perhaps more accurately, a very close approximation to it. In Fig. 2, the approximation is indicated by the dotted line 3, and dotted lines 4, 5, 6, and 7, indicate the absorption diagrammatically and separately. For example, the dotted line 7 indicates that red rays are absorbed from the artificial light, reducing it from the curve 2 to the line 7. Similarly the dotted lines 4, 5, and 6 represent other absorptions supplementary to the absorptions indicated by the line 7. The dotted line 3 indicates the net result of the various absorptions as has been stated.

In the present invention the color filter or absorbing screen is of purple color and blue color. The point of the present invention is that the color filter or screen may consist of glass, containing or embodying these colors and since it is of glass and is otherwise proper and effective for the purpose in hand, it can be used, for example, as the globe or bulb of an electric light and in that case there is provided a source of artificial illumination which has the effect of daylight and such a source of artificial daylight illumination is so far as I know at present unknown.

I am, of course, aware of the fact that color screens or filters have been made or suggested, but I do not believe that there ever existed a source of light such as an electric lamp in which the globe or bulb operated to make the electric lamp produce immediately and directly the effect of daylight illumination.

To produce glass of the requisite generally blue color and absorbing qualities, use is made of nickel which may be introduced as nickel oxid or salts, and the use of this material for the purpose of making artificial daylight glass I believe to be novel. It is well known that blue glass can be produced by the use of cobalt.

Referring to the drawings, glass of purple color produced by the use of nickel and glass of blue color produced by the use of cobalt, is diagrammatically illustrated as mixed together.

By way of further description, and not limitation, it may be said that where potash lime glass is used the following proportions produce good results:

Sand _____ .208 pounds.
Potassium carbonate_ .091 "
Calcium carbonate___ .025 "
Potassium nitrate____ .0167 "

To a batch weighing one-third of a pound or 2333 grains, four grains of black nickel oxid, $Ni_2O_3$, may be added to produce the required kind of purple glass. To a similar batch cobalt oxid may be added to produce the blue glass of required color. When this is done the glasses can be mixed together. Instead of doing this, the nickel oxid and the cobalt oxid may be added to the batch of glass.

In giving proportions of the coloring materials it must be borne in mind that the proportions are not hard and fast, but are to be changed so as to produce the desired result from any artificial light under consideration, having regard to the thickness of the glass. This is well understood by those skilled in the art.

It will be obvious to those skilled in the art that modifications may be made in details without departing from the spirit of the invention, hence the same is not limited further than the prior state of the art may require.

What I claim is:

1. A color filter or absorbing screen for transforming the light of artificial illuminants to daylight character comprising a glass composition containing nickel and cobalt and being of generally blue color when viewed by daylight.

2. A color filter or absorbing screen for transforming the light of artificial illuminants to daylight character comprising a potash glass composition containing nickel and cobalt and being of generally blue color when viewed by daylight.

In testimony whereof I have hereunto signed my name.

EDWARD J. BRADY.

Witnesses:
S. E. PATTERSON,
FRANK E. FRENCH.